July 4, 1939.  F. SCHAEFER  2,164,474

BRAKE HANGER

Filed March 8, 1938

WITNESSES
aBWallace.
V.A.Peckham.

INVENTOR.
Frederic Schaefer
BY Brown, Critchlow + Flick
his ATTORNEYS.

Patented July 4, 1939

2,164,474

UNITED STATES PATENT OFFICE 2,164,474

BRAKE HANGER

Frederic Schaefer, Pittsburgh, Pa.

Application March 8, 1938, Serial No. 194,596

2 Claims. (Cl. 188—209)

This invention relates to hangers for suspending brake beams from the trucks of railway cars.

Railway brake beams are generally suspended from the trucks by hangers connected to the brake heads and supported at their upper ends by brackets projecting inwardly from the truck side frames. While the car is in motion with the brakes slack (released), the hangers continually vibrate and swing back and forth in the brackets and brake heads, whereby they are subjected to rapid wear at their bearing areas.

It is among the objects of this invention to prolong the life of brake hangers, and more specifically to provide a brake hanger which is made principally of ordinary or medium carbon steel, but the life and resistance to wear of which are materially increased.

According to this invention a brake hanger is formed having vertical side arms connected at least at their lower ends by a substantially horizontal yoke. The upper ends of the side arms may be connected in like manner, or may be otherwise formed to permit the hanger to be suspended from a truck bracket. The bearing member in which the lower yoke is mounted is the brake head. The yoke or yokes are formed from a plurality of elements rigidly secured together, such as by welding. The principal element or body of the yoke is that portion which is directly connected to the side arms, and it is reduced in vertical thickness relative to the over-all thickness of the yoke. The other element of the yoke is a wearing member formed of metal having a greater hardness than the body member and is preferably welded thereto. The exposed surface of this wearing member is preferably arcuate in cross-section throughout its length to form the usual bearing surface of the yoke. The inner surface of the body member against which the wearing member is disposed is also preferably arcuate in cross-section and is connected to the outer surface of the body member by lateral surfaces. The side edges of the wearing member are preferably spaced from these lateral surfaces to form elongate recesses in which welding metal is disposed for connecting the two members together, as it is highly desirable that no portion of the weld project beyond the surface of the yoke. The principal portion of the hanger, such as the side arms and main body of the yoke connected thereto, may be made in the usual manner of medium carbon steel. However, as the wearing member is of greater hardness than the remainder of the yoke the life of the yoke is prolonged materially.

Figure 1:
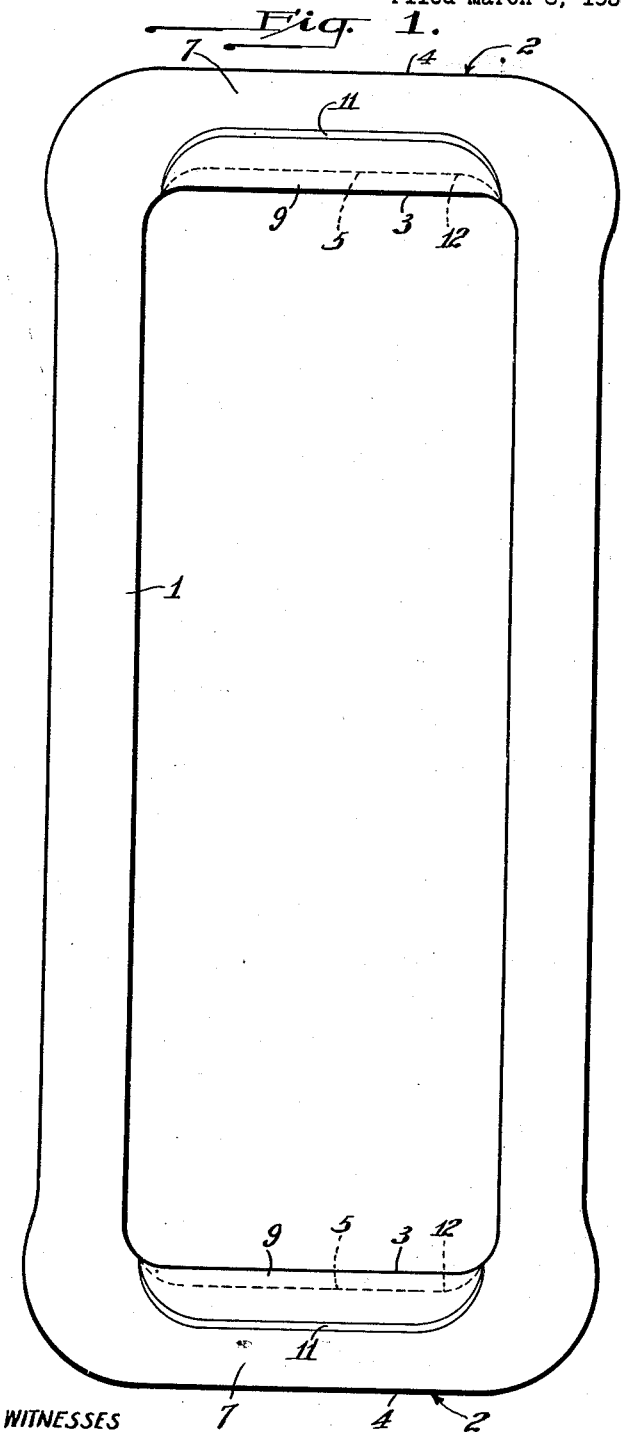
Figure 2:
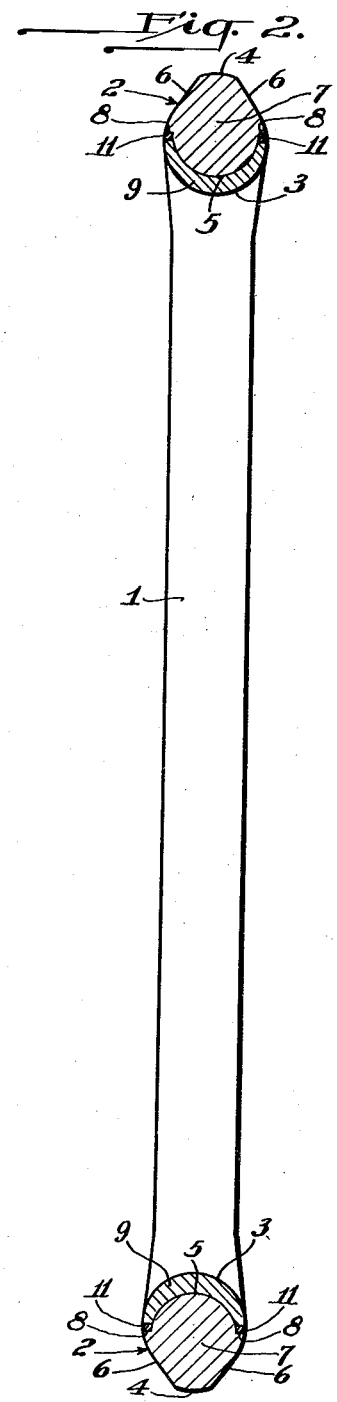

One form in which the invention may be embodied is illustrated in the accompanying drawing in which Fig. 1 is a side view of a loop brake hanger; and Fig. 2 is a vertical section of the hanger taken through the central portions of the yokes.

Referring to the drawing, there is shown a loop-type brake hanger comprising substantially vertical side arms 1 disposed in spaced parallel relation and integrally connected at their opposite ends by substantially horizontal yokes 2. As shown in Fig. 2, each yoke is provided with an inner arcuate main bearing surface 3 and an outer arcuate secondary bearing surface 4, the area of the former surface being materially greater than that of the latter, and the two proportioned for the load which they encounter. To increase the strength of the yoke and simplify its formation, as well as to minimize the internal strains set up in it when it is heat treated, its sides 6 are made substantially flat and converge towards each other from the edges of the main to the edges of the secondary bearing surface. The shape of the yoke when so formed gives it greater shear-resisting strength and permits it to be interlocked with a brake beam in a well-known manner.

It is a feature of this invention that the main or inner bearing surface of each yoke is materially harder than the other surfaces thereof. This is accomplished by forming the inner bearing surface of a separate piece of metal which is considerably harder than the metal of which the body 7 of the yoke is formed. For this purpose the main body of the yoke, which is integrally connected to the side arms, is reduced in vertical thickness and its inner surface 5 (Fig. 2) is preferably arcuate in cross-section and connected to the outer surface or sides of the yoke by lateral surfaces 8 lying in the same plane. The other element of the yoke is a wearing member or shoe 9 formed of metal which is materially harder than that of the main body of the yoke. The inner surface of this shoe conforms to the arcuate inner surface of the main body of the yoke, and its exposed surface is arcuate in cross-section to form the main bearing surface 3 of the yoke. Wearing member 9 and body 7 are suitably connected together, such as by welding. Preferably, the side edges of the wearing shoe are spaced from lateral surfaces 8 of the yoke body to form narrow recesses extending the full length of the wearing member. It is in these recesses that welding metal 11 is disposed for welding the wearing member to the yoke body. In this way the two members can be securely welded together without the welds projecting beyond the surface of the yoke.

Preferably, the yoke body 7 is reduced in vertical thickness for only a portion of its length, whereby a recess 12 is formed therein for receiving the wearing member. The ends of this recess preferably gradually become shallower as indicated by the dotted lines in Fig. 1, and the ends of the wearing member become gradually thinner in a corresponding manner so as to fit in the recess. The most economical construction is one in which the wearing member is thickest in its central portion, where it receives the most wear, and tapers toward its side edges (Fig. 2) and its ends (Fig. 1). The thickness of the wearing member should be substantially equal to the amount of wear permitted by the American Railroad Association, so that by the time the wearing member is worn through it is necessary to discard the hanger or to attach a new wearing member. On the other hand, the wearing member is not so thick that it is necessary to discard the hanger before the shoe has been substantially worn away.

Although a loop-type hanger has been illustrated and described, it is obvious that this invention is also applicable to the lower yoke of a U-shaped brake hanger such, for example, as shown in my Patent No. 1,942,777. In either case the advantage of making the principal portion of the hanger of ordinary steel is present, while the life of the hanger is materially increased without increasing its cost an undue amount.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A brake hanger having a yoke adapted to be inserted in a bearing member, said yoke comprising a substantially horizontal body member of reduced vertical thickness having its inner surface arcuate in cross-section and joined to its outer surface by lateral connecting surfaces, and a wearing member of greater hardness than said body member and conforming in contour to said arcuate surface, the side edges of said wearing member being spaced from said lateral surfaces to form elongated recesses, and a weld disposed in each recess for securing said wearing member to said body member.

2. A brake hanger having a yoke adapted to be inserted in a bearing member, said yoke comprising a substantially horizontal body member provided along its inner surface with a recess the base of which is arcuate in cross-section and is connected to the outer surface of the body member by lateral surfaces, and a wearing member of greater hardness than said body member and conforming to said arcuate base, the side edges of said wearing member being spaced from said lateral surfaces to form elongated recesses, and a weld disposed in each of said elongated recesses for securing said wearing member to said body member, the outer surface of said wearing member being arcuate in cross-section to form the bearing surface of said yoke.

FREDERIC SCHAEFER.